United States Patent [19]

Craine

[11] 4,086,710
[45] May 2, 1978

[54] BRAIN DAMAGE TESTING

[76] Inventor: James F. Craine, 116 Kaapuni Dr., Kailua, Hi. 96734

[21] Appl. No.: 409,660

[22] Filed: Oct. 25, 1973

[51] Int. Cl.² ............................................. G09B 19/00
[52] U.S. Cl. ................................. 35/22 R; 200/11 A
[58] Field of Search ............ 35/22 R, 9 R, 9 A, 9 B, 35/9 C, 9 D; 200/11 A

[56] References Cited

U.S. PATENT DOCUMENTS

| | | | |
|---|---|---|---|
| 1,860,895 | 5/1932 | Marx | 35/9 C |
| 2,870,549 | 1/1959 | Craine | 35/22 R |
| 3,284,584 | 11/1966 | Didyk | 200/11 A |
| 3,543,418 | 12/1970 | Press | 35/22 R |

Primary Examiner—William H. Grieb
Attorney, Agent, or Firm—James C. Wray

[57] ABSTRACT

A person's memory of sequences is tested by shifting a relationship between switches and colored lights which they control. Switches in a row light colored lamps in a fixed sequence. A two part circular switch with opposed contacts equal in number to the switches or colors may be turned to shift the sequence of colors which the switches control. One part of the circular switch may be inverted so that the sequence of colors controlled by the switches may be reversed and may be shifted in reversed order. Inserts positioned between the two parts of the circular switch change the sequential relationships of colored lights and switches.

10 Claims, 5 Drawing Figures

BRAIN DAMAGE TESTING

BACKGROUND OF THE INVENTION

The speed at which one masters new problems and the amount of mistakes that one makes in achieving correct results are recognized in the prior art as useful measurements. Such tests are appreciably aided by the use of lights and switches to control the lights. Prior art devices include the Intelligence Testing Apparatus disclosed by James F. Craine in U.S. Pat. No. 2,870,549 issued Jan. 27, 1959.

Dr. Craine's apparatus as described in that patent tests an individual's capability to adapt to changing situations. An individual is required to reproduce a geometric pattern from a card by lighting lamps in that pattern. When one switch arrangement is mastered, the arrangement is radically turned upside down or sideward in either direction, or a mirror image is created. The apparatus has the possibility of randomly arranging the switches so that their geometric arrangement has no relation to the geometric arrangement of lamps to be lighted.

Another prior art device employs lights of varied colors on a board. Switches are set to light three lamps in a pattern. A subject lights a fourth light to complete the pattern. There is no unique switch-lamp relationship to present a problem to the subject.

Known prior art devices have required recognition of patterns as a prerequisite to producing useful test results. Often a test measures a subject's ability of pattern recognition rather than the subject's intelligence or possible brain damage.

SUMMARY OF THE INVENTION

The present invention displays color in a response to an individual's selection and operation of a switch. When the individual recognizes which switch operates which color and is able to repeatedly light a desired color, a freedom from brain dysfunction is demonstrated.

To determine whether the person's brain is capable of shifting and using the learned sequence under different circumstances, the present invention is employed.

After one has gained proficiency and exhibited a learning, the sequence of color response is shifted along the switches. A person with brain damage has difficulty lighting the desired colors after a reasonable number of tries. A normal person usually succeeds in lighting the desired lamps after a few tries.

While colored lights are preferred as a readily ascertainable response, it is envisioned that any varied responses which are distinguishable one from the other may be usefully employed. Audible tones are an example; pictures may be selectively displayed, in place of colored lights, or designated areas of boxes may be illuminated with back lighting or projected light of uniform or varied color.

Controllers are operated by the individual being tested in response to instructions to produce a response. According to the desired response and its method of operation, the controllers may be electromechanical devices such as toggle switches or push buttons which make or break electric circuits which supply power to the response media.

Alternatively, the controllers may be hydraulic or pneumatic valves, and the response may be controlled directly or through fluidic relays. In either case, sequence shifting may be accomplished by shiftable line interconnectors.

The controllers may be purely mechanical devices which operate mechanical responses. The sequence shifting devices may be mechanical links, for example push rods connected to flexible cable display operators In any of the devices, whether electrical, mechanical or fluid operated, an appropriate sequence shifting apparatus is employed to vary the relationships of controllers to responses, while maintaining a relationship of sequential adjacent controllers controlling a fixed sequence of responses. For example, before shifting, controller 1 controls response A, 2 controls response B, 3 controls C, 4-D . . . Controller (n-2) controls response X, controller (n-1) controls Y, and $n$ controls Z. After shifting, 1 controls Y, 2-Z, 3-A 4-B . . . $n$ controls X.

In a preferred embodiment, the controllers are arranged in a single row for simplicity. Where color responses are employed, each of six controllers may operate one of the three primary and three secondary colors.

The sequence shifting means in a preferred electrical embodiment is a two-part circular switching apparatus. Opposed contacts are arranged in two sets on inner faces of the parts. Axle means provides for relatively rotating the parts to shift the contacts to new communication links, maintaining the same sequence. The inner faces on which the contacts are mounted may be flat faces or concentrically opposed faces.

To improve trueness of those colors for facilitating their recognition by the individual being tested, the light source employs many similarly colored lamps which are lighted together. Numbers of lights in color groups are varied inversely to intensity of their output. In the orange group, fewer lamps may be required than in the blue group, for example. Lights are spaced in a box behind a translucent plate to produce even washing of the plate with color. In a preferred embodiment, instructions which are requests for color illumination are given by exposing colored cards. Thus the test may be conducted irrespective of an individual's ability to identify colors.

Once an individual's ability to learn to apply and to shift a sequence has been tested, it may be useful to reverse the sequence and to shift the reversed sequence. Further tests may be accomplished by inverting one part of the two part circular switch.

Variations from the sequence are produced in a further use of the invention by inserting interconnectors between the parts of the circular switch. The interconnectors may relate switches and colors in a determinable variation of the original sequence or in a randomly varied new sequence.

An object of this invention is the provision of an apparatus and a method for intelligence testing which employs a number of varied sensorily perceptible indicators operated by an equal number of controllers through means which may shift responses to other controllers while maintaining the sequence in which controllers and responses are varied.

Another object of this invention is the provision of a brain damage testing device which has colored lamps individually controlled by switches which may be reconnected to operate different lamps by linearly changing an interconnector so that a sequence of responses will be shifted along a bank of switches, whereby one may learn a sequence and then apply that knowledge of sequence to a different situation.

This invention has as another object the provision of a sequence shifting apparatus having relatively moveable, equidistantly spaced sets of contacts for changing connections between controllers and responders while maintaining a uniform sequential relationship for use in psychological test apparatus.

Another object of the invention is the provision of a two-part circular switch with contacts arranged on opposing faces of the parts, so that the parts may be relatively shifted to maintain a sequence of elements connected to the respective switch parts while shifting a sequential relationship of those elements. p A further object of the invention is the provision of a sequence-changing interconnector for inserting between contacts of a two-part switch.

These and other and further objects of the invention are apparent in the present disclosure, which includes the specification and its claims and the drawings, which show a preferred embodiment of the invention by way of example.

DETAILED DESCRIPTION OF THE DRAWINGS

Figure 1:
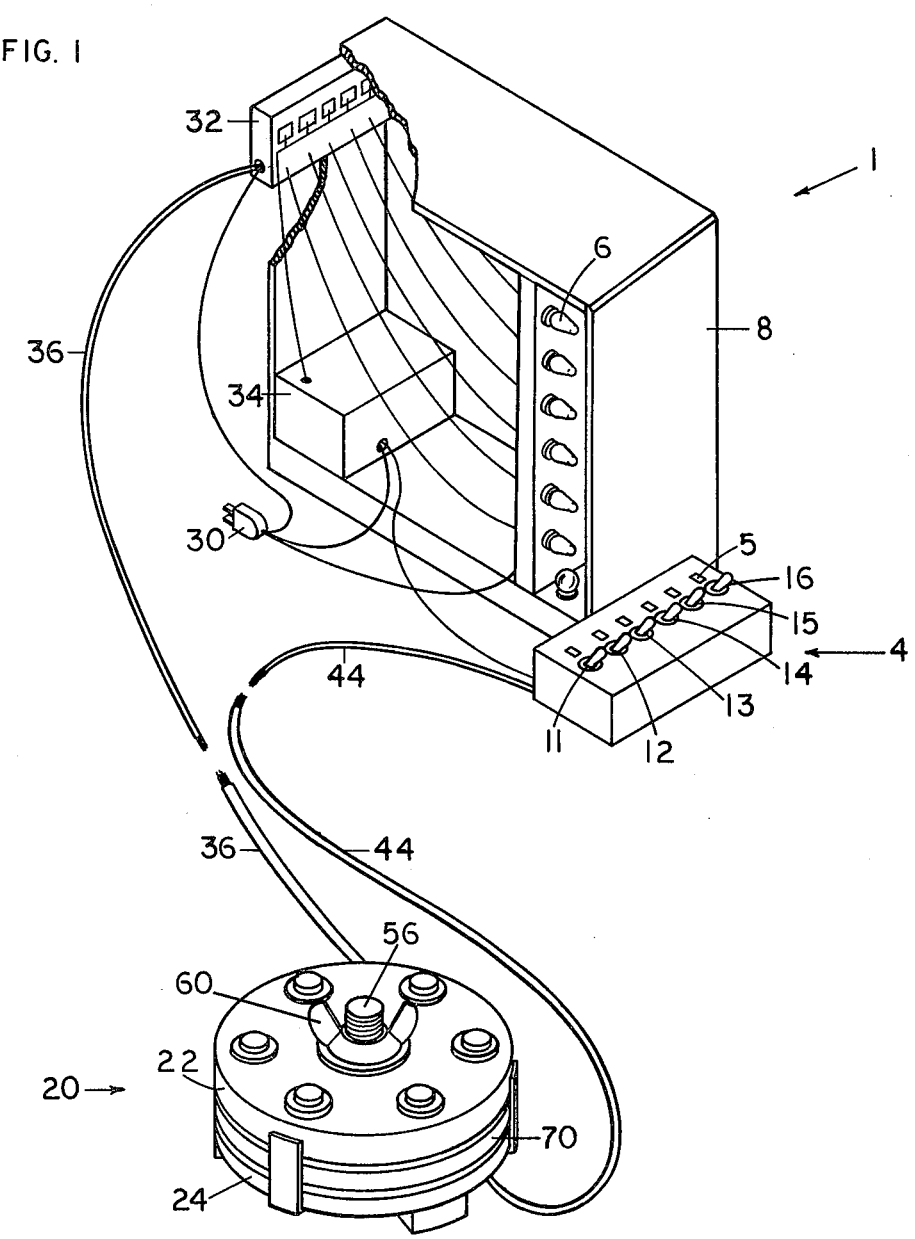
FIG. 1 is a perspective schematic view of psychological testing apparatus constructed according to this invention.

Referring to FIG. 1, a testing apparatus is generally indicated by the numeral 1. An individual being tested moves switches 4 to selectively light lamps 6 for displaying a desired color on screen 8.

Several lamps of identical color are controlled by each switch to provide uniform illumination of screen 8 and to provide longevity between maintenance. Two or three dead lamps in a single color field do not interfere with the operation of the apparatus. When several bulbs appear to be extinguished, one simply removes the screen, lights one color at a time and replaces burnt lamps of that color, which are readily distinguished by the color of the darkened lamps.

In one application of the invention a logical choice for sequence of colors is the spectral order of red, orange, yellow, green, blue and violet. The particular ordering of the colors is not significant, other than for the facilitating of learning of a sequence. In the following example a random sequence of color is described.

An individual learns that switches 11, 12, 13, 14, 15 and 16 respectively light, for example, red, blue, green, yellow, purple and orange lamps. Upon ensuring that the individual has learned the sequence of switch-light relationships, the psychologist or technician who is administering the test changes the setting on the rotary sequencing switch 20, by relatively rotating parts 22 and 24 one or two notches. The colors which are controlled thus change switches, but the sequence of colors which are activated by the switches remains constant.

In the example previously cited, after the rotary switch 20 is moved one notch, switch 12 controls red, 13-blue . . . and 11-orange. When rotary switch 20 is stepped two notches from its original position, switch 13 lights red lamps 14-blue . . . 11-purple and 12-orange.

The individual then is instructed to light particular colors. An individual who has no brain damage is able to apply the sequence which he learned in the first operation to the second shifted positions of the switches which operate the colors. After a few tries the individual should be able to light any color at will. One who is capable of performing the second step with the shifted colors would be free of the type of brain damage measured by this test.

An individual who fails may be again given the opportunity to learn the sequential relationship of switches 4 to the various colors before the rotatable switch is again stepped to a new position.

The individual's application of the learned sequence to the new switch-color arrangement again is tested. One who is unable to apply the learned sequence to the new circumstance should be given further attention for the possibility of brain damage.

The switches 4 may or may not be identified by color. Preferably the device is used with indicia 5 adjacent switches 4. An elongated strip having an indication of colors may be placed adjacent the switches 4. The strip may remain in its original position during the second step following shifting of the rotary switch 20. Alternatively, the strip may be removed before the second step.

In an alternate test the strip may be shifted before the second step, one end being concealed while another end is exposed to indicate the revised switch-color relationship. The test for brain damage is then conducted in a third step following a second shifting of the rotary switch 20. During the third step, the strip is removed or is left in its second step position.

In a preferred embodiment of the invention, lamps 6 are regularly arranged with a plurality of lamps connected in each color response circuit. The translucent plate is evenly washed with color so that an individual neither is encumbered nor is aided by an apparent sequence of lights in the light box.

As further shown in FIG. 1, a plug 30 supplies available alternating current to lamps 6 via a bank of relays 32, which control distribution of the power to lamps of like color. Transformer 34 steps down the alternating voltage to a safe, convenient arc-preventing voltage, which is applied to controller switches 4, sequencing switch 20 and lamp-operating relays 32.

Each of the six relays 32 controls a separate color - red, green, blue, yellow, orange or violet.

Figure 2:
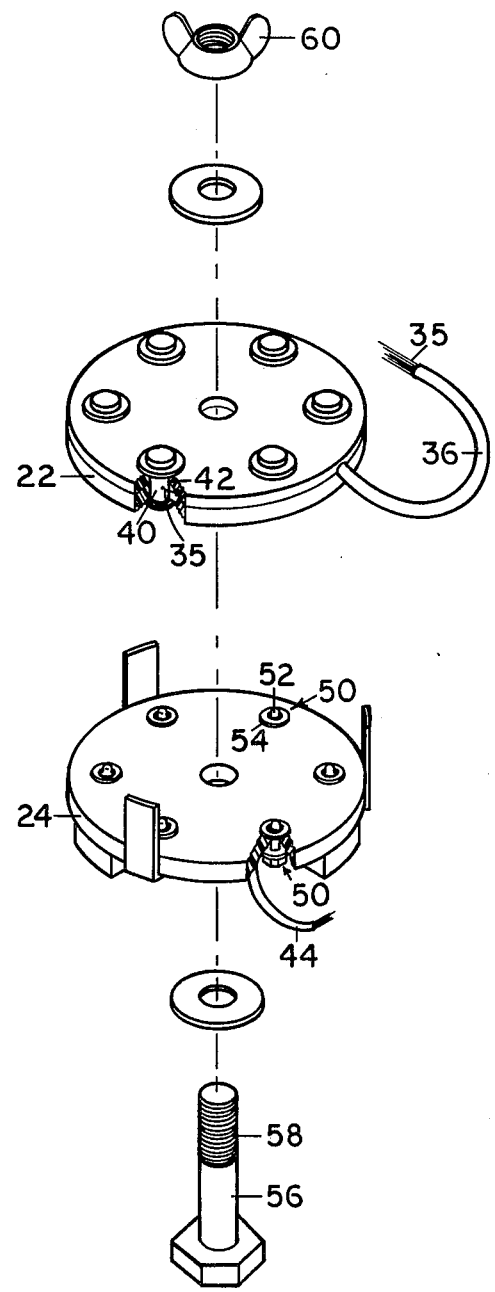
FIG. 2 is a detail of a circular sequence shifter switch in exploded form.

Insulated wires 35 in cable 36 are connected at first ends to the relays 32. As shown in FIG. 2, second ends of the wires 35 are soldered to a number of conductors 40, which are positioned in holes 42, equidistantly arranged in a circle in first part 22 of the rotary sequencing switch 20. Heads of conductors may be recessed, raised or flush with the opposite faces of first switch part 2. Heads of conductors 40 may be enlarged to anchor the conductors in the first part 22.

Wires in cable 44 are attached at first ends to switches 4. Second ends of the wires are soldered to contacts 50 in second switch part 24.

Spring-loaded contacts 50 are circularly arranged on an upper face of second part of sequencing switch 20. Contacts 50 have rounded faces 52, which project from bases 54 in circular block 24, forming a second set of contacts which electrically communicate with contacts 40 of the first set. Springs within bases 54 urge elements 52 toward exposed faces of contacts 40 in switch part 22. The parts may be relatively rotated without loosening the assembly. Sufficient slack is permitted in cables 36 and 44 to allow wires to move with the circular blocks 22 ad 24 as the parts are relatively turned to vary the connections between switches and lamp-operating relays. When the switch parts 22 and 24 are relatively turned, the switch-lamp relationship is changed, but the sequence of colors is maintained.

Axle 56 extends through central openings in switch parts 22 and 24. Screw threads 58 on the upper end of axle 56 receive fastener 60, which may be a wing nut.

When the fastener is removed, the upper part 22 may be inverted to reverse the sequence of colors controlled by the switches.

Figure 3:
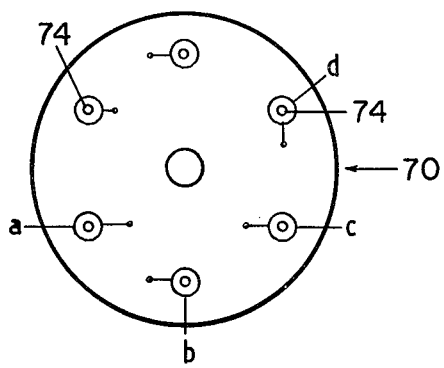
FIGS. 3, 4 and 5 are plan elevation and bottom views of a response sequence varying interconnector for use in psychological testing apparatus of the invention.
Figure 4:
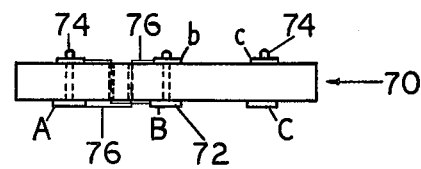
Figure 5:
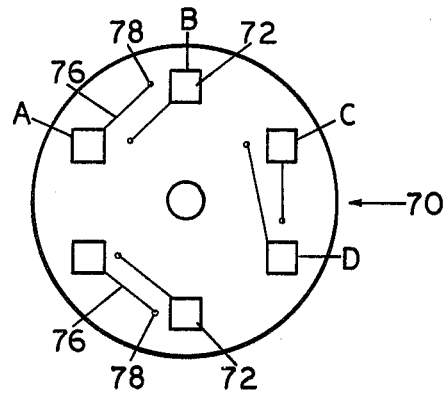

Axle 56 is sufficiently long so that an interconnector such as shown in FIGS. 3, 4 and 5 may be inserted between switch parts 22 and 24. Interconnector 70 has plates 72 on a lower face for engaging contacts 50 on switch part 24. Spring loaded contacts 74 on an upper face of interconnector 70 engage contacts 40 in switch part 22. Wires 76 pass through holes 78 and interconnect selected plates 72 and contacts 74.

In the example wires 76 interconnect plates and contacts to functionally reverse the colors controlled by adjacent switches 4. Plate A is connected to contact $b$; plate B is connected to contact $a$; C to $d$; D to $c$, etc.

By changing the wiring 76, varied color sequence changes are accomplished. All interconnectors change the sequence of colors; some, as in the example, change the sequence in a determinable and predictable manner. Others change the sequence randomly.

The individual taking the present Craine Color Screen test is confronted with an apparatus containing a color screen and six switches. He is told that each switch controls a different color and that he will be asked to manipulate the switches and cause these colors to appear on the color screen. In order to achieve this task in a regular and orderly manner, he will be shown a series of color-cards and asked to depress the proper switch so as to put the same color on the screen that is shown to him on each card in turn. He is to try to perform this function quickly and with as few mistakes as possible, with special emphasis on trying to avoid mistakes. In the first presentation, as the color keys in front of the switches indicate, the switches are programmed to present the colors in the natural order: Red, Orange, Yellow, Green, Blue, and Violet. This is the same order in which colors can be seen in the rainbow or when sunlight is shown through a prism.

The color-cards are presented one by one in randomized order for all six colors and then repeated in a different randomized order so that the six colors will have been flashed upon the color screen twice, a total of twelve cues in all. The subject taking the test is required to put the correct color on the color screen before the next color-card is exposed. This means that if he selects the wrong switch, he is required to turn it off and continue to make selections until he puts the correct color on the screen. When he is successful in matching the color-card, the following card is exposed as his next cue. When all twelve color-cards have been exposed, the first series is considered completed, and a record is made of the time required and the number of errors made.

Before the second series is started, a change is made in the master switch, and the individual is told that he is going to be shown the color-cards again. Once again he will be asked to put the same colors on the color screen, but he is told that a change has been made in terms of which switches control which colors. He is informed that this is a logical and orderly change and that his task is to try to discover for himself the exact nature of the change. He is to try once again to put the proper color on the color screen as quickly and with as few mistakes as possible.

The second series can be considered a variation of the first series, because the colors remain in the same sequential order but are displaced along the switches one, two or more steps. It could be said that the object of the test is firstly to present a statement of a principle in the initial series of switch-color relationships; then secondly, after the subject has mastered the principle, he is required to apply this knowledge in order to solve the puzzle encountered when variations of the principle are given in subsequent presentations. After two or three variations of the principle have been successfully solved (a total of five variations is possible for each principle), a statement of another principle can be presented by inserting an interconnector between switch parts 22 and 24 followed by its variations by relatively rotating parts 22 and 24. At the present time the Craine Color Screen Test is programmed to present six separate principles and their variations, with all of these changes being made in a logical and orderly manner.

In the hope that the preceding statements may be clarified, an example can be given in order to demonstrate the exact nature of the problem presented. If the switches 4 are numbered from 1 to 6, reading from left to right as the apparatus is faced, the colors called forth by these switches for three of the principles and a few of their variations can be written as follows:

| Switches | 1 | 2 | 3 | 4 | 5 | 6 |
|---|---|---|---|---|---|---|
| Example 1 | | | | | | |
| Principle | R | O | Y | G | B | V |
| a. Variation | O | Y | G | B | V | R |
| b. Variation | G | B | V | R | O | Y |
| Example 2 (inverting part 22) | | | | | | |
| Principle | V | B | G | Y | O | R |
| a. Variation | O | R | V | B | G | Y |
| b. Variation | G | Y | O | R | V | B |
| Example 3 (with interconnector 70) | | | | | | |
| Principle | O | R | G | Y | V | B |
| a. Variation | G | Y | V | B | O | R |
| b. Variation | V | B | O | R | G | Y |

An acceptable rationale for this test of higher mental functions is necessarily fairly complex. In the first place, successful performance on this test implies ability in concept formation. A person's ability to conceptualize and to apply these concepts to situations which vary in a logical and orderly manner is tested by repeatedly shifting the relationship between switches and the colored lights which they control. Concept formation is one of the aspects of every thought process, and the effects of impairment or dysfunction of intellectual abilities due to brain damage can be noticed earlier in this process than in other types of thought processes. Hence a test designed for the purpose of making assessments in this particular area can prove to be extremely useful.

Another function being tested is the one that is called intellectual flexibility or adaptability. This pertains to a type of thought process that evidences a willingness or a readiness to be responsive to changing conditions in a problem-solving situation. A test of this is achieved by presenting the individual taking the test with a problem (to discover and remember which switches turn on which colors) and then, after a successful solution is obtained, require him to change his point of reference in order to solve the same problem again and again. By structuring a series of changes, each one requiring a different approach to reach the correct solution, such a testing device will provide an objective measure of an individual's intellectual flexibility. It has been demonstrated that the function of intellectual flexibility is notably lacking in brain damaged patients. Organic brain damage will tend to cause an intellectual and behavioral rigidity that is characterized by an inability to shift readily from one attitude or set to another. Instead, the individual will tend to perseverate and to hold rigidly to former ways of gaining a solution to the task.

Another function being tested is that of immediate recall. Brain damage tends to present difficulties in this area, especially when the function is demanded repeatedly for successful conclusion of required tasks. The performance becomes poorer and poorer as fatigue quickly blocks efficient operation of memory functions which may have appeared to be completely intact at the beginning of the complex task.

Although the present invention has been described partially by specific example, it will be obvious to those skilled in the art that modifications may be employed without departing from the teachings of the invention. The invention is precisely defined only in the appended claims.

I claim:

1. Intelligence testing apparatus comprising a collection of response means which are readily ascertainable varied responses which are distinguishable one from the other for individually producing unique sensory perceptions in a subject being tested, an array of controllers positioned before the subject, the controllers being severally and operably connected to the response means for controlling operation of individual response means upon operating corresponding controllers, and sequence shifting means for changing relationships of the controllers and the response means while maintaining a uniform linear sequence relationship of response to controllers, controller (1) controlling response A, controller (2) controlling response B, (3) controlling C . . . , $n-2$ controlling X, $n-1$ controlling Y, controller "$n$" controlling response Z before operation of the shifting means, and controller 1 controlling response Y, controller (2) controlling response Z, (3) controlling A, (4) controlling B, 5 controlling C, . . . controller $n$ controlling response X, after shifting, wherein the response means are indicators selected from the group of readily ascertainable responses consisting of varied audible tones, selectively displayed pictures and electric lamps of varied colors connected together in groups of single colors and mounted within a box and wherein the controllers are switches arranged in a sequential geometric order.

2. Intelligence testing apparatus comprising a collection of response means which are readily ascertainable varied responses which are distinguishable one from the other for individually producing unique sensory perceptions in a subject being tested, an array of controllers positioned before the subject, the controllers being severally and operably connected to the response means for controlling operation of individual response means upon operating corresponding controllers, and sequence shifting means for changing relationships of the controllers and the response means while maintaining a uniform linear sequence relationship of response to controllers, controller (1) controlling response A, controller 2 controlling response B, (3) controlling C . . . , $n-2$ controlling X, $n-1$ controlling Y, controller "$n$" controlling response Z before operation of the shifting means, and controller 1 controlling response Y, controller (2) controlling response Z, (3) controlling A, (4) controlling B, (5) controlling C, . . . controller $n$ controlling response X, after shifting, wherein the response means are visual indicators and wherein the controllers are switches arranged in a sequential geometric order, and wherein the visual indicators are electric lamps of varied colors connected together in groups of single colors and mounted within a box.

3. Intelligence testing apparatus comprising a collection of response means which are readily ascertainable varied responses which are distinguishable one from the other for individually producing unique sensory perceptions in a subject being tested, an array of controllers positioned before the subject, the controllers being severally and operably connected to the response means for controlling operation of individual response means upon operating corresponding controllers, and sequence shifting means for changing relationships of the controllers and the response means while maintaining a uniform linear sequence relationship of response to controllers, controller (1) controlling response A, controller (2) controlling response B, (3) controlling C . . . , $n-2$ controlling X, $n-1$ controlling Y, controller "$n$" controlling response Z before operation of the shifting means, and controller 1 controlling response Y, controller (2) controlling response Z, (3) controlling A, (4) controlling B, (5) controlling C, . . . controller $n$ controlling response X, after shifting, wherein the response means are electric lights of varied colors mounted in a box having a translucent face facing a subject being tested, further comprising a plurality of relays, each being connected to electric lights of an individual colored light, a power source having a high voltage portion connected to the relays for supplying the lights with high voltage power, and having a low voltage source connected to the relays, wherein the sequencing means comprises a two part circular switch having a first set of contacts connected severally to the relays and having a second set of contacts moveable in a sequence maintaining and order changing manner with respect to the first set of contacts, and wherein the controllers comprise switches arranged in a row, each switch being connected to a contact in the second set of contacts, and being connected to the low voltage source for selectively applying power to one relay, which completes a supply of high voltage power to lights of one color, the switches and lights being related before sequence shifting, for example, switch (1) controlling blue, (2) controlling green, 3-yellow, 4-orange, 5-red, 6-violet, and after sequence shifting 1-green, 2-yellow, 3-orange, 4-red, 5-violet, 6-blue, and after a second sequence shifting 1-red, 2-violet, 3-blue, 4-green, 5-yellow, 6-orange.

4. Brain damage testing apparatus comprising a plurality of electric lamps of varied colors, mounted in a box having a translucent face for displaying a color to a person being tested, a power source having a first line connected to the lamps, a sequence shifting means having first and second relatively shiftable sets of like pluralities of contacts, each contact within the first set being operatively connected with one lamp of one color, a like plurality of switches mounted in a row before the person, each switch being connected to a unique contact in the second set and being connected to the power source, whereby operating a switch lights a lamp which displays a color, and whereby shifting the first and second sets of contacts changes the respective lamps which are controlled by the switches, displacing an order in which the switches control the lamps, while maintaining a sequence in which adjacent switches are related to lamps, whereby for example in one relative position of the first and second sets of contacts, switch 1 lights a red lamp, switch (2) lights a blue lamp, (3) lights yellow, 4-orange, 5-green, and switch (6) lights a purple lamp, and in another relative position of the first and second sets of contacts switch 1 lights yellow, 2-orange, 3-green, 4-purple, 5-red, and 6 lights blue.

5. The apparatus of claim 4 wherein the sequence shifting means comprises first and second generally cylindrical blocks having adjacent inner faces, the first cylindrical block having inward oriented contacts equally spaced in circular arrangement on an inner face of the block, the second cylindrical block having inward oriented contacts equally spaced in circular arrangement on an inner face of the second block directly opposite contacts in the first block, means to urge contacts together, and means including an axle for relatively rotating the blocks to change communication between contacts.

6. The brain damage testing apparatus comprising a plurality of electric lamps of varied colors, mounted in a box having a transparent face for displaying a color to a person being tested, a power source having a first line connected to the lamps, a sequence shifting means having first and second relatively shiftable sets of like pluralities of contacts, each contact within the first set being operatively connected with one colored lamp, a like plurality of switches mounted in a row before the person, each switch being connected to a unique contact in the second set and being connected to the power source, whereby operating a switch lights a lamp which displays a color, and whereby shifting the first and second sets of contacts changes the respective lamps which are controlled by the switches, displacing an order in which the switches control the lamps, while maintaining a sequence in which adjacent switches are related to lamps, whereby for example in one relative position of the first and second sets of contacts, switch (1) lights a red lamp, switch (2) lights a blue lamp, (3) lights yellow, 4-orange, 5-green, and switch (6) lights a purple lamp, and in another relative position of the first and second sets of contacts switch (1) lights yellow, 2-orange, 3-green, 4-purple, 5-red, and (6) lights blue; a removable relatively shiftable interconnector positioned between the first and second sets of contacts, the interconnector comprising an insulator block having opposite faces, a third set of contacts arranged on one face of the insulator for communicating with the contacts in the first set, and a fourth set of contacts on the opposite face of the insulator for communicating with contacts in the second set, and conductors extending through the insulator and severally connecting individual contacts in the third set with individual contacts in the fourth set, whereby relationships between contacts in the first and second sets may be varied according to connections of the conductors and relative position of the interconnectors.

7. A shiftable sequencing means for use in a testing apparatus comprising first and second mounts, having juxtaposed inner generally circular faces, a first set of electrical contacts mounted in equally spaced circular array on an inner face of the first mount equidistant from its center, a second set of electrical contacts mounted in equally spaced circular array on an inner face of the second mount, equidistant from its center, means urging contacts in opposite sets together and means including an axle connected to at least one of the mounts for relatively rotating the mounts to positions in which contacts in the first set electrically communicate with contacts in the second set, means connected to contacts in the first set for lighting lamps of varied colors in single color groups and switch means connected to contacts in the second set, each switch controlling light of a color selected according to the relative position of the first and second mounts.

8. Interconnector apparatus in shiftable sequencing switches of testing apparatus of claim 7 comprising an insulator block having first and second opposite faces, a first set of contacts equidistantly arranged in a geometric pattern on the first face, a second set of contacts equidistantly arranged in a geometric pattern on the second face, and conductors extending through the insulator and severally connecting one-to-one contacts in the first set with contacts in the second set, whereby relationship between connectors abutting the contacts is altered according to connections of the conductors.

9. The method of testing for brain damage in a person comprising:

placing a colored lamp array and switches to light the lamps before a person, permitting the person to become familiar with which switches illuminate which colors, changing a position of a sequencing means, thereby shifting a sequence of colors controlled by the switches while maintaining a sequential relationship of lighting controlled by adjacent switches, instructing the person to light several colors, and observing the person's capacity to light desired colors.

10. The method of claim 9 comprising the further steps of again changing position of the sequencing means maintaining a sequential relationship of colors which are lit, while the order of switches controlling the colors is changed, and again instructing the lighting of several colors.

* * * * *